April 3, 1951 F. J. JOHNSON 2,547,161
VARIABLE-SPEED GEARING FOR DRIVING PROPELLERS
Filed July 4, 1945 4 Sheets-Sheet 1
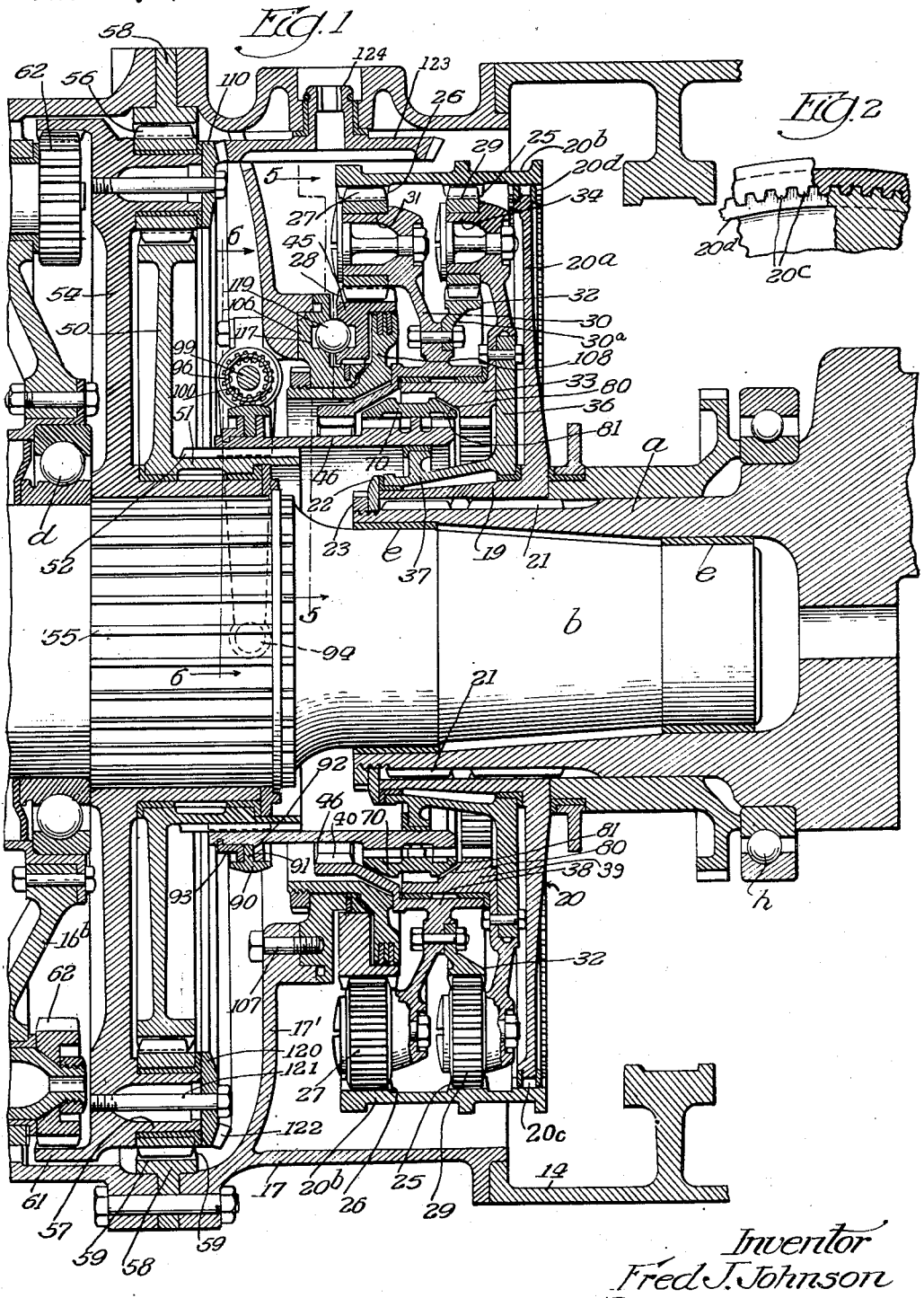
Inventor
Fred J. Johnson
By Fred Gerlach
his Atty

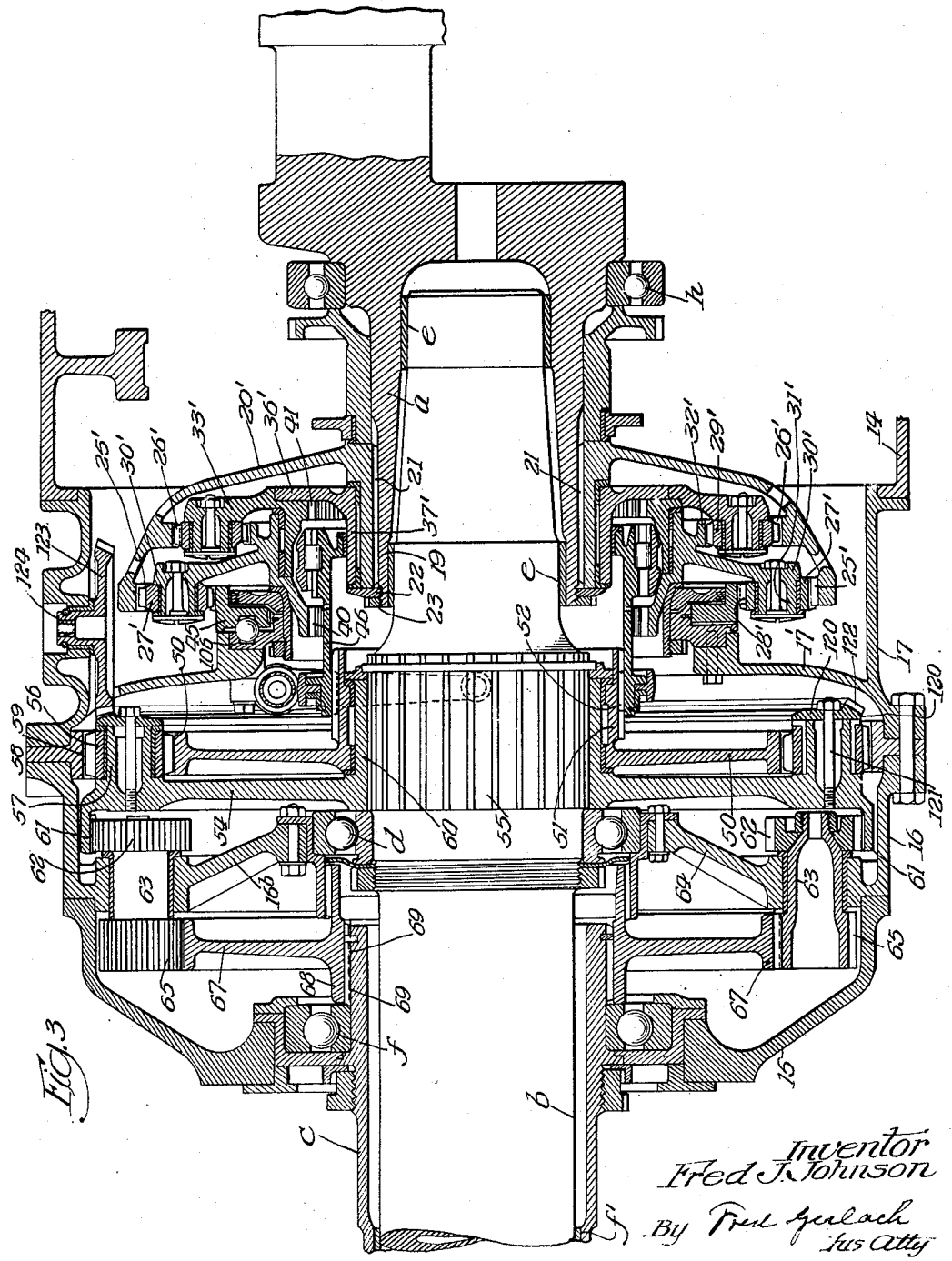

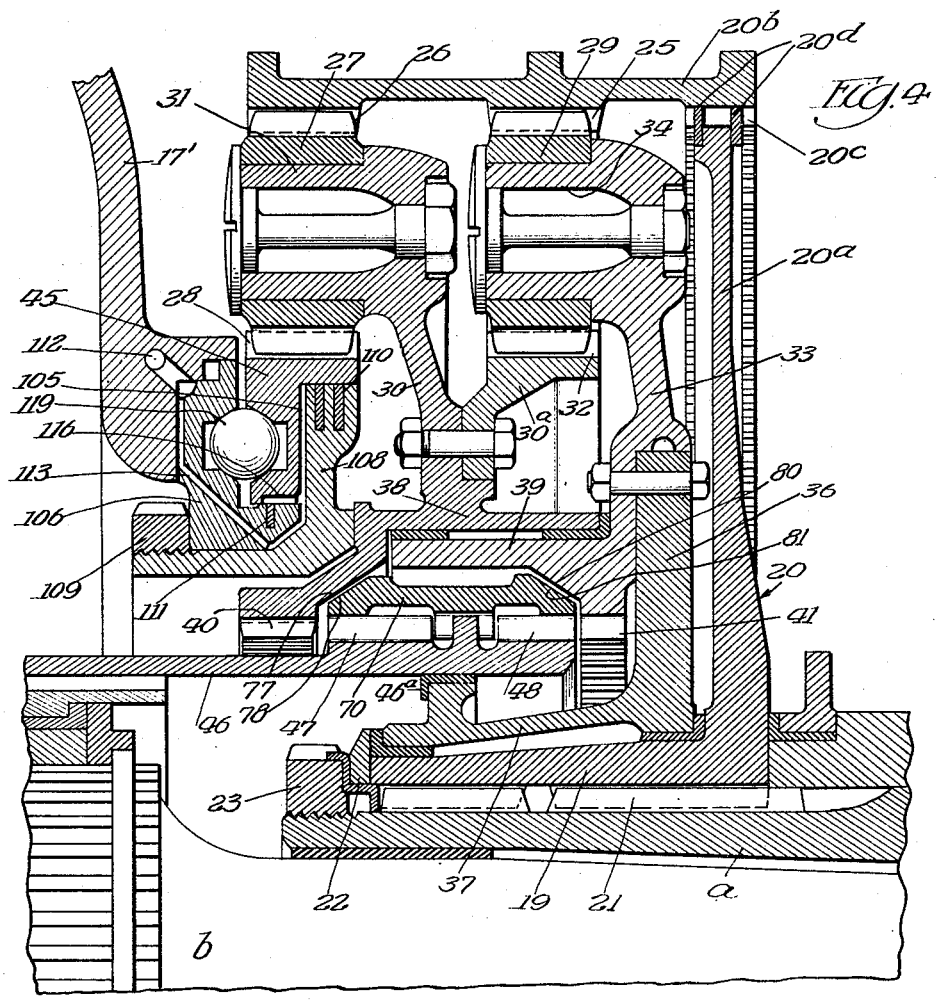

April 3, 1951  F. J. JOHNSON  2,547,161
VARIABLE-SPEED GEARING FOR DRIVING PROPELLERS
Filed July 4, 1945  4 Sheets-Sheet 4
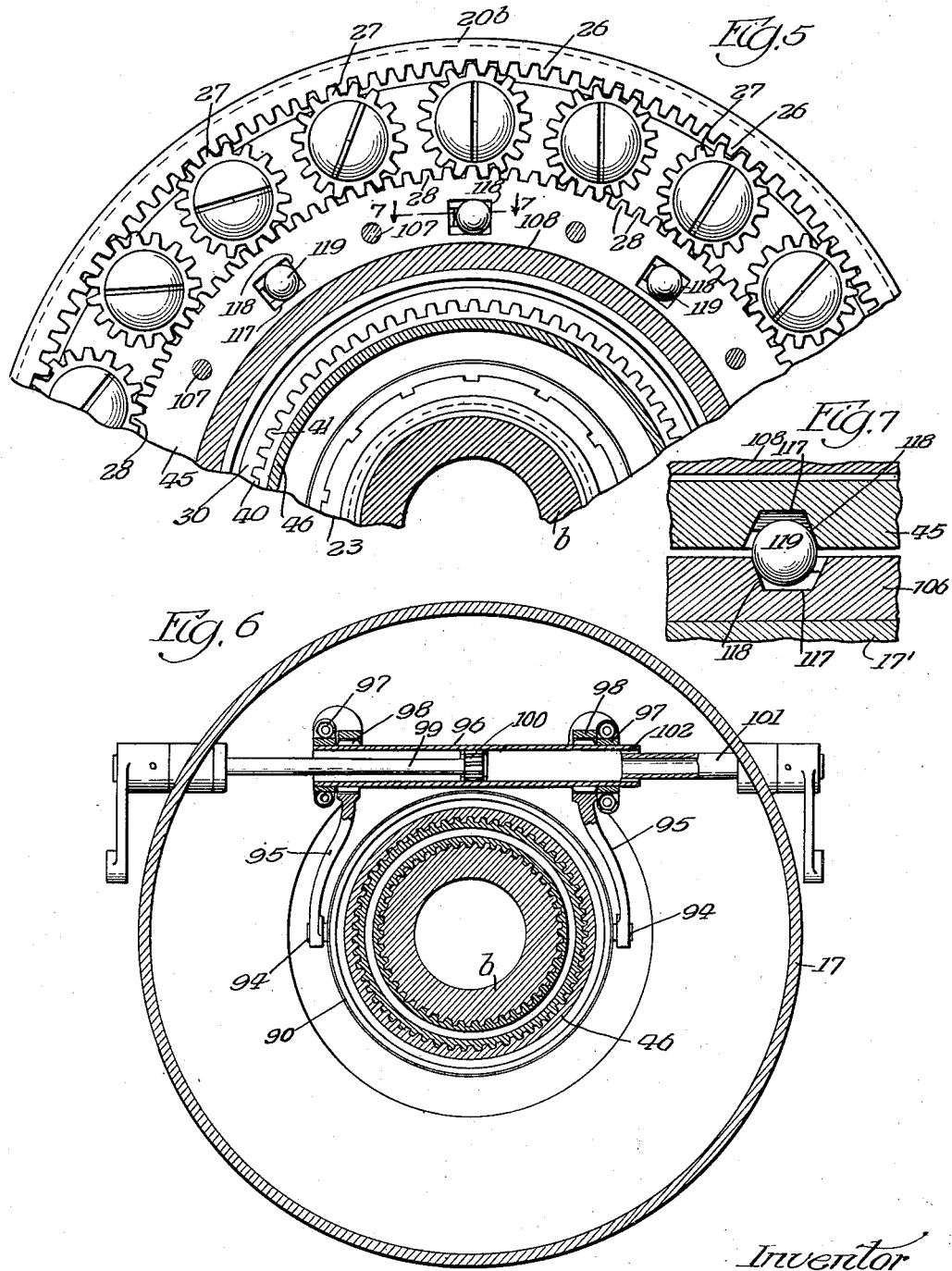
Inventor
Fred J. Johnson
By Fred Gerlach
His Atty.

Patented Apr. 3, 1951

2,547,161

UNITED STATES PATENT OFFICE 2,547,161

VARIABLE-SPEED GEARING FOR DRIVING PROPELLERS

Fred J. Johnson, Ferndale, Mich., assignor to Avco Manufacturing Corporation, a corporation of Delaware Application July 4, 1945, Serial No. 603,151

15 Claims. (Cl. 74—674)

1

The invention relates to reduction gearing for driving aircraft propellers.

One object of the invention is to provide reducing gearing of this type in which planetary gearing is used and in which a multiplicity of gear-teeth transmit torque from a single input shaft to the output shaft.

Another object of the invention is to provide improved speed reducing gearing of this type in which the gearing is radially symmetrical about the axis of the input and the output shafts, for driving aircraft propellers.

Another object of the invention is to provide planetary speed reducing gearing which includes a substantially stationary sun-gear for operating a torque meter so that the parts of the torque meter can be mounted on the housing with limited rotation only for the operation of the torque meter.

Another object of the invention is to provide speed reducing gearing of this type which is light and compact in construction.

Other objects of the invention will appear from the detailed description.

The invention consists in the several features hereinafter set forth and more particularly defined by claims at the conclusion hereof.

In the drawings:

Fig. 1 is a longitudinal section of the two-speed reduction gearing embodying the preferred form of the invention and a portion of the gearing driven by the clutch for contra-rotationally driving a pair of co-axial propellers.

Fig. 2 is a detail of the spline-connection between sections of the gear-wheel which is driven by the crank-shaft of the engine.

Fig. 3 is a longitudinal section of a modified form of the two-speed reduction gearing and the gearing for driving a pair of contra-rotating propellers.

Fig. 4 is a section on a larger scale of a portion of the two-speed reduction gearing shown in Fig. 1.

Fig. 5 is a section taken on line 5—5 of Fig. 1.

Fig. 6 is a longitudinal section of the torque-meter, taken on line 6—6 of Fig. 1.

Fig. 7 is a section taken on line 7—7 of Fig. 5.

The invention is exemplified in driving mechanism which comprises generally: two-speed planetary reduction gearing which is driven by power from the crank-shaft $a$ of an internal combustion engine; clutch mechanism which is driven by the two-speed reduction gearing, and gearing driven by the clutch mechanism for driving the shaft $b$ of one propeller and the hollow shaft

2 or sleeve $c$ of a contra-rotating propeller. This driving mechanism is enclosed in a gear-case which usually comprises a rear-section 14 which may be secured to the front of the engine-casing, a front-section 15, and intermediate sections 16 and 17. The propeller shaft $b$ is journalled in an anti-friction bearing $d$ which is supported in the gear-case section 16 and in bushings $e$ confined in a socket in the front of the crank-shaft $a$. The hollow shaft or sleeve $c$ for driving a co-axial second propeller is journalled in an anti-friction bearing $f$ mounted in the front gear-case section 15, and also on shaft $b$, by bushings $f'$. The front end of craft-shaft $a$ is journalled in an anti-friction bearing $h$ which is usually mounted in the front end of the engine-casing (not shown).

The invention in Fig. 1 is exemplified in two-speed reduction gearing for driving the propeller-shafts $b$ and $c$ from the crank-shaft $a$ of an internal combustion engine. This two-speed gearing comprises: a wheel, generally designated, 20 which is provided with a hub 19 on the front end of crankshaft $a$ and secured to rotate with said shaft by splines 21; a collar 22 and a nut 23 for securing wheel 20 against axial movement on the front end of crank-shaft $a$; an internally toothed gear 25 on wheel 20; an internally toothed gear 26 on wheel 20 and of the same pitch diameter as gear 25; an annular series of planetary pinions 27 meshing with gear 26; a sun-gear 28 meshing with planetary pinions 27 and which has its rotation limited by a torque meter, as hereinafter described; an annular series of planetary pinions 29 meshing with gear 25; a low-speed carrier 30 which is provided with integral studs 31 on which planetary pinions 27 are journalled for rotation on their own axes; a sun-gear 32 of the same pitch diameter as the sun-gear 28, on a ring 30ª which is bolted to carrier 30, and meshing with the planetary pinions 29; a high-speed carrier 33 provided with forwardly projecting integral studs 34 on which planetary pinions 29 are journalled for rotation on their own axes and which includes a body-section 36 and a hub 37 which is journalled and axially confined on the forwardly extending hub 19 of wheel 20 for rotation of carrier 33 relatively to wheel 20; a hub 38 on carrier 30 which is journalled on the hub 39 of carrier 33 for relative rotation of carrier 30.

In the preferred form of two-speed reduction gearing shown in Fig. 1, the drive-wheel 20 comprises a body 20ª which is integrally formed with the hub 19 and the internal gears 25 and 26 are integrally formed on a separately formed drum 20b. The drum 20b may also have the teeth of gear 26 formed as elongations of the teeth of gear 25. The body 20a and member or drum 20b are secured to rotate together by splines 20c which are interlocked against axial movement by spring-rings 20d. In this form of the invention, gears 25 and 26 have the same pitch diameter, pinions 27 and 29 have the same pitch diameter, and sun-gears 28 and 32 have the same pitch diameter.

In this two-speed reduction gearing, the high and low speed carriers and the rotatable sun-gear are co-axial; the internal gears 25 and 26 on drive-wheel 20 rotate co-axially with the carriers and the planetary movement of the pinions is around the axis of the internal gears and the carriers. The high-speed carrier 33 is journalled on drive-wheel 20 and the low-speed carrier 30 is journalled on the high-speed carrier 33. This arrangement provides a compact construction which is an advantageous mechanism for driving propellers.

A rotatable and axially slidable clutch-sleeve 46 is engageable with the carrier 30 for driving the propellers at the low-speed ratio and with carrier 33 for driving them at the high-speed ratio. An internal peripheral portion of the hub 38 of carrier 30 is provided with an integral annular series of clutch-teeth 40 which are engageable with mating clutch-teeth 47 on sleeve 46 for driving the sleeve and propellers at the low-speed ratio. An internal peripheral portion of the hub 39 of carrier 33 is provided with an annular series of clutch-teeth 41 which are engageable by a mating series of clutch-teeth 48 on clutch-sleeve 46 for driving said sleeve and the propellers at the high-speed ratio. The inner end of clutch-sleeve 46 is slidably supported and journalled for relative rotation, as at 46a, on the hub 37 of section 36 of carrier 33. When clutch-teeth 47 on sleeve 46 are engaged by axial sliding movement of the sleeve with clutch-teeth 40 on carrier 30, said sleeve will be driven by the two-speed reduction gearing at the low-speed ratio. When sleeve 46 is shifted axially to engage its clutch-teeth 48 with clutch-teeth 41 on carrier 33, said sleeve will be driven by the two-speed reduction gearing at the high-speed ratio. When the clutch-sleeve 46 is axially positioned with its teeth 47 and 48 between the clutch-teeth 40 and 41, said sleeve will be in its neutral position and uncoupled from the two-speed reduction gearing.

The sun-gear 28 is held against rotation relatively to the internally toothed gear 26 on drive-wheel 20, in co-action with gear 25, for imparting planetary movement to pinions 27 and driving the high-speed carrier 33 and the low-speed carrier 30 by a torque meter which is used to operate an indicator (not shown) for torque being delivered by the engine to the two-speed reduction gearing. This torque meter includes a cylinder 105; a ring-piston 45 on the rim of which the teeth of sun-gear 28 are formed; and an annular casing for the cylinder 105 which comprises a section 106 which is fixedly secured by bolts 107 to a cross-wall 17' in casing-section 17 and an annular head 108 which is angular in cross-section and extends through section 106 and is fixedly secured thereto by a nut 109. Piston-rings 110 form a seal between head 108 and an internal peripheral portion of piston 45 and a piston-ring 111 forms a seal between said piston and casing-section 106. Oil is delivered to the cylinder 105 of the torque meter from a constant displacement torque meter oil pump which is supplied with oil from the main engine lubricating system. The torque meter oil system is connected through the gear-casing in any suitable manner to a duct 112 in wall 17' which is communicatively connected by a duct 113 in the casing-section 106 to deliver oil under pressure into the cylinder 105. The pressure of the oil in the torque meter oil system is responsive to the torque produced by the engine. Duct 112 is connected to a torque indicator (not shown) of the type which is responsive to variations in the pressure of the oil in said system. Piston 45 is provided with a port 116 which by-passes oil from cylinder 105 into the gear-case. The inner face of casing-section 106 and the confronting face of piston 45 are provided with recesses 117 having co-acting inclined cam-ends 118 which engage opposite sides of balls 119 so that the torque applied to sun-gear 28 and piston 45 will cause the inclined or cam-surfaces 118 and balls 119 to shift the piston 45 in cylinder 105. As the torque applied to sun-gear 28 increases, the co-acting inclined surfaces 118 of recesses 117 will cause the piston 45 to move rearwardly against the pressure of oil in cylinder 105, decrease the oil discharged through port 116 and increase the pressure of oil in cylinder 105 and duct 112. As the torque of the sun-gear 28 and piston 45 decreases, the pressure of oil in cylinder 105 will force piston 45 to increase the by-pass of oil through port 116 and reduce the pressure of oil in duct 112, which is communicatively connected to the torque indicator. In this manner, the indicator will be responsive to the torque exerted on the sun-gear 28.

In this torque-meter the ring-piston 45 is non-rotatable with the two-speed gearing, except for the slight rotation in controlling the outlet duct or port 116 responsively to variations in torque. The torque is applied through sun-gear 28 through which both the high and low speed carriers are driven. Headsection 108 holds the hub 38 of carrier 30 against longitudinal or axial movement on hub 39 of carrier 33. When the propellers are being driven at the low-speed ratio through planetary pinions 27, carrier 30 and clutch-sleeve 46, the torque-meter will be responsive to the torque and the driving load for low-speed driving, and will also be responsive to the load and the engine torque when the clutch-sleeve 46 is being driven at the high-speed ratio from the low-speed carrier 30 through planetary pinions 27, sun-gear 32, planetary pinions 29, and high-speed carrier 33.

Mechanisms for axially shifting the clutch-sleeve 46 for controlling the speed ratio at which the propeller shaft b is driven, is exemplified by a non-rotatable shifter-collar 90 which is provided with an inwardly extending flange 91 which is confined between an annular shoulder 92 and a collar 93 on, and for slidably shifting sleeve 46 while the latter is rotating; diametrically opposite pivot-studs 94 on collar 90; arms 95 having their distal ends pivotally connected to studs 94; a tubular shaft 96 journalled in brackets 97 which are fixed to a cross-wall 17' in gear-case section 17 and to which arms 95 are splined, as at 98; and a torque-rod 99 extending through tubular shaft 96 and splined thereto at 100. The torque-rod 99 may be connected in any suitable manner for remote control, usually by a hydraulic piston and cylinder which is adapted to provide torque for rocking arms 95 to shift clutch-sleeve 46 between its high-speed and low-speed driving positions. A shaft 101 is splined, as at 102, to tubular shaft 96 for operating an indicator (not shown) for the setting of the clutch mechanism.

A balk-ring 76 extends around the clutch-teeth 47 and 48 on clutch-sleeve 46 for restraining the engagement of clutch-teeth 47 on sleeve 46 with clutch-teeth 40 on the low-speed carrier 30 and the engagement clutch-teeth 48 on sleeve 46 with clutch-teeth 41 on the high-speed carrier 33, until the carriers, respectively, and the clutch-sleeve are rotating substantially at synchronous speeds. This balk-ring has limited rotation on the clutch-sleeve 46 and is provided with a conical friction-face 78 engageable with a mating friction-face 77 on the low-speed carrier 30 and with a conical friction-face 81 engageable with a mating friction-face 80 on the high-speed carrier 33 for controlling the balk-ring through teeth on the balk-ring and abutments on sleeve 46. The construction and operation of the balk-ring is disclosed in Patent No. 2,403,594, dated July 9, 1946.

Gearing is provided for driving the propeller drive-shaft $b$ and propeller drive-sleeve $c$ from clutch-sleeve 46 which is operable at the high and low speed ratios as before described. This gearing comprises an externally toothed gear-wheel 50 which is provided with a hub 51 on which the front end of said sleeve 46 is slidable and to which clutch-sleeve 46 is splined as at 52, and is driven at the same speed as the clutch-sleeve; a carrier 54 which is splined, as at 55, to drive the propeller shaft $b$; an annular series of planetary pinions 56 which mesh with wheel 50 and are journalled for rotation on their own axes on studs 57 which are integral with and project from one side of carrier 54; a ring 58 which is stationarily secured between gear-case sections 16 and 17 and provided with internal gear-teeth 59 which mesh with pinions 56 for imparting planetary movement to said pinions and rotation to carrier 54. Hub 51 of wheel 50 is journalled for relative rotation on hub 60 of carrier 54 which is splined to shaft $b$. Wheel 50, in co-action with the stationary internally toothed gear 59, imparts planetary movement to pinions 56 when wheel 50 is driven by clutch-sleeve 46 for driving carrier 54 which is fixed to propeller-shaft $b$ in one direction. The sleeve $c$ for driving a co-axial contra-rotating propeller is driven from carrier 54 which is fixed to shaft $b$ by gearing which comprises: an annular internally toothed gear 61 integrally formed on carrier 54; an annular series of externally toothed pinions 62 which mesh with gear 61 and are secured on stud-shafts 63 which extend through and are journalled in a wall 16$^b$ formed in gear-case section 16; an annular series of pinions 65 integral with and driven by stud-shafts 63; and an externally toothed gear-wheel 67 which meshes with pinions 65 and is provided with a hub 68 which is splined, as at 69, to sleeve $c$. The pitch diameter of the externally toothed gear-wheel 67 is less than the pitch diameter of the internally toothed gear 61 on carrier 54, and the pitch diameters of pinions 62 and 65 are of such ratio that gear-wheel 67 on sleeve $c$ will be driven at the same speed as carrier 54 which rotates with shaft $b$ but in the opposite direction. This gearing for contra-rotationally driving shaft $b$ and sleeve $c$ is driven from clutch-sleeve 46 from which they may be selectively driven at the high and low speed ratios from the engine by the two-speed planetary reduction gearing, and also effects a speed reduction between sleeve 46 which receives the output from the two-speed reducing gearing and shaft $b$ and sleeve $c$ which drive the propellers.

A ring 120 is secured by bolts 121 which extend through said ring and the stud-shafts 57 for planetary pinions 56, to rotate with carrier 54, and is provided with a bevel gear 122. A bevel gear-wheel 123 on a stud-shaft 124 which is journalled in gear-case section 17, meshes with gear 122, for driving a propeller governor of usual construction, at a speed proportionate to the speed of the propellers.

Any suitable number of planetary pinions 27 and 29 may be provided and any suitable number of planetary pinions 56 may be provided for producing the desired multiplicity of simultaneously gear-tooth contacts in which large propeller-shaft torques are produced.

The operation of the two-speed reduction gearing will be as follows: When sleeve 46 is shifted axially and forwardly by the rotation of shaft 96 and arms 95 to mesh its clutch-teeth 47 with clutch-teeth 40 on the low speed carrier 30, the sun-gear 28 is limited against rotation by the torque-meter, and the gear 25 on primary drive-wheel 20 will impart planetary movement to pinions 27; the planetary movement of pinions 27 will rotate carrier 30 and drive the clutch-sleeve 46 through meshing teeth 40 on said carrier and teeth 47 on sleeve 46 at a reduced speed relatively to the crank-shaft $a$. The sun-gear 32 on carrier 30 and gear 25 on wheel 20 will then impart idle planetary movement to pinions 29 so the carrier 33 will idle around clutch-sleeve 46. When clutch-sleeve 46 has been axially shifted rearwardly to mesh its clutch-teeth 48 with clutch-teeth 41 on the high-speed carrier 33, planetary movement will be imparted to pinions 27 by sun-gear 28 and internal gear 26 on wheel 20; carrier 30 will rotate sun-gear 32 relatively to carrier 33 and with gear 25 will impart planetary movement to pinions 29 so that carrier 33 will be driven in the same direction as carrier 30 and at the high-speed ratio relatively to the shaft $a$.

The contra-rotation gearing is selectively driven at the high and low speed ratios provided by the two-speed planetary reduction gearing through clutch-sleeve 46 and its operation is as follows: wheel 50 will be driven by a spline-connection 52 with clutch-sleeve 46; rotation of wheel 50, in co-action with stationary gear 59, will impart planetary movement to pinions 56 and rotation to wheel 54, which carries said pinions, and drive the propeller-shaft $b$ through splines 55. Simultaneously, the internally toothed gear 61 will drive pinions 62, shaft 63 and pinions 65; and the pinions 65 will rotate gear-wheel 67 which is splined to the sleeve $c$ which drives the other propeller. In this operation, the gearing for contra-rotationally driving shaft $a$ and sleeve $c$ will drive them at the same speed.

A modified form of the two-speed reduction gearing between the engine-shaft $a$ and clutch-sleeve 46 is illustrated in Fig. 3. This modification exhibits a construction substantially similar to that heretofore described, except that the drive-wheel, which is splined to the crank-shaft of the engine, is provided with integral annular internal gears for driving the two series of planetary pinions, respectively, and the sun-gears and the internally toothed gears have relatively different pitch diameters. This form comprises a wheel 20′ splined, as at 21, to the front end of crank-shaft $a$; a collar 22 and a nut 23 for securing wheel 20' against axial movement on the front end of crank-shaft $a$; an internally toothed gear 25' integral with wheel 20'; an internally toothed gear 26' also integral with wheel 20' and of lesser pitch diameter than the gear 25'; an annular series of planetary pinions 27' meshing with gear 25'; a sun-gear 28' meshing with planetary pinions 27' and which is held against rotation by a torque-meter of the construction described; an annular series of planetary pinions 29' meshing with gear 26'; a low-speed carrier 30' which is provided with integral studs 31' on which planetary pinions 27' are journalled for rotation on their own axes; a sun-gear 32' of lesser pitch diameter than the sun-gear 28', integrally formed with carrier 30' and meshing with planetary pinions 29'; a high-speed carrier 33' provided with forwardly projecting integral studs on which planetary pinions 29' are journalled for rotation on their axes and which includes a body-section 36' and a hub 37' which is journalled and axially confined on the forwardly extending hub 19 of wheel 20' for rotation of carrier 30' which is journalled on the hub 37' or carrier 33' for relative rotation of carrier 30'. Clutch-teeth 40 on carrier 30' and clutch-teeth 41 on carrier 33' and clutch-sleeve 46 are of the same construction hereinbefore described. The operation of this modification form of the invention is similar to the operation of the construction illustrated in Fig. 1, except that the ratio of speed reduction is varied.

The invention exemplifies two-speed planetary gearing for driving a clutch from the crank-shaft of an engine which is adapted for great propeller-shaft torques; in which there is a low degree of re-action of the transmitted loads on the gear-case; in which the gearing is symmetrical on the axis of the crank-shaft and propeller shaft; in which a single sun-gear, which is responsive to torque for driving at high and low speeds, is limited against rotation by a torque-meter which comprises axially slidable elements which do not require rotation with the gearing. The invention also exemplifies planetary two-speed gearing which comprises a clutch through which co-axial propellers are contra-rotationally driven.

The invention is not to be understood as limited to the details described, since these may be modified within the scope of the appended claims without departing from the spirit and scope of the invention.

Having thus described the invention, what I claim as new and desire to secure by Letters Patent is:

1. Driving mechanism for a propeller, comprising: a driving-wheel driven by an engine-shaft; an internal gear on said driving-wheel; a substantially non-rotating sun-gear; planetary pinions between and meshing with said internal gear and the non-rotating sun-gear; a low-speed carrier on which said planetary pinions are journalled and rotatable by their planetary movement; a sun-gear rotatable with the low-speed carrier; a second internal gear on the driving-wheel; a high-speed carrier co-axially rotatable with the low-speed carrier; planetary pinions journalled on the high-speed carrier and meshing with the second internal gear and the rotatable sun-gear on the low-speed carrier; clutch-teeth on the low-speed and high-speed carriers; a clutch-sleeve co-axial with the carriers and provided with teeth selectively engageable with the clutch-teeth on the carriers; and means for driving a propeller-shaft from the clutch-sleeve.

2. Driving mechanism for a propeller, comprising: a driving-wheel driven by an engine-shaft; an internal gear on said driving-wheel; a substantially non-rotating sun-gear; planetary pinions between and meshing with said internal gear and the non-rotating sun-gear; a low-speed carrier on which said planetary pinions are journalled and rotatable by their planetary movement; a sun-gear rotatable with the low-speed carrier; a second internal gear on the driving-wheel; a high-speed carrier co-axially rotatable with the low-speed carrier; planetary pinions journalled on the high-speed carrier and meshing with the second internal gear and the rotatable sun-gear on the low-speed carrier; clutch-teeth on the low-speed and high-speed carriers; a clutch-sleeve coaxial with the carriers and provided with teeth longitudinally between and selectively and slidably engageable with the clutch-teeth on the carriers; and means for driving a propeller-shaft from the clutch-sleeve.

3. Driving mechanism for a propeller, comprising: a driving-wheel driven by an engine-shaft and provided with a hub; an internal gear on said driving-wheel; a substantially non-rotating sun-gear; planetary pinions between and meshing with said internal gear and the non-rotating sun-gear; a low-speed carrier on which said planetary pinions are journalled and rotatable by their planetary movement; a sun-gear rotatable with the low-speed carrier; a second internal gear on the driving-wheel; a high-speed carrier co-axially rotatable with the low-speed carrier and journaled on the hub of the driving-wheel; planetary pinions journaled on the high-speed carrier and meshing with the second internal gear and the rotatable sun-gear on the low-speed carrier; clutch-teeth on the low-speed and high-speed carriers; a clutch-sleeve selectively engageable with the clutch-teeth on the carriers; and means for driving a propeller-shaft from the clutch-sleeve.

4. Driving mechanism for a propeller, comprising: a driving wheel co-axial with and driven by an engine-shaft and provided with a hub; an internal gear on said driving wheel; a substantially non-rotating sun-gear co-axial with the driving wheel; a low speed carrier; planetary pinions meshing with said internal gear and the non-rotating sun-gear and journalled on and for rotating the low-speed carrier; a sun-gear co-axial with and rotatable with the low-speed carrier; a second internal gear on the driving wheel; a high-speed carrier journalled on the hub of the driving wheel and provided with a hub on which the low-speed carrier is journalled; planetary pinions journalled on and for rotating the high-speed carrier and meshing with said second internal gear and the rotatable sun-gear; co-axial internal clutch-teeth on the high and low-speed carriers; a clutch-sleeve selectively slidable provided with external clutch-teeth for engaging the clutch-teeth on the carriers, respectively; and means for driving a propeller-shaft from the clutch-sleeve.

5. Driving mechanism for a propeller, comprising: a driving wheel co-axial with and driven by an engine-shaft and provided with a hub; an internal gear on said driving wheel; a substantially non-rotating sun-gear co-axial with the driving wheel; a low-speed carrier; planetary pinions meshing with said internal gear and the non-rotating sun-gear and journalled on and for rotating the low-speed carrier; a sun-gear co-axial with and rotatable with the low-speed carrier; a second internal gear on the driving wheel; a high-speed carrier journalled on the hub of the driving wheel and provided with a hub on which the low-speed carrier is journalled; planetary pinions journalled on and for rotating the high-speed carrier and meshing with said second internal gear and the rotatable sun-gear; co-axial internal clutch-teeth on the high and low speed carriers; a clutch-sleeve selectively slidable and provided with external clutch-teeth movable axially between and for engaging the clutch-teeth on the carriers, respectively; and means for driving a propeller-shaft from the clutch-sleeve.

6. Driving mechanism for a propeller, comprising: a driving wheel co-axial with and driven by an engine-shaft and provided with a hub; an internal gear on said driving wheel; a substantially non-rotating sun-gear co-axial with the driving wheel; a low-speed carrier; planetary pinions meshing with said internal gear and the non-rotating sun-gear and journalled on and for rotating the low-speed carrier; a sun-gear co-axial with and rotatable with the low-speed carrier; a second internal gear on the driving wheel; a high-speed carrier journalled on the hub of the driving wheel and provided with a hub on which the low-speed carrier is journalled; planetary pinions journalled on and for rotating the high-speed carrier and meshing with said second internal gear and the rotatable sun-gear; co-axial internal clutch-teeth on the high and low speed carriers; a clutch-sleeve selectively slidable and provided with external clutch-teeth movable axially between and extending around the hub on the low-speed carrier; and means for driving a propeller-shaft from the clutch-sleeve.

7. Driving mechanism for a propeller, comprising: a driving wheel driven by an engine-shaft; an internal gear on said driving wheel; a substantially non-rotating sun-gear; planetary pinions between and meshing with said internal gear and the non-rotating sun-gear; a low-speed carrier on which said planetary pinions are journalled and rotatable by their planetary movement; a sun-gear rotatable with the low-speed carrier; a second internal gear on the driving wheel; a high-speed carrier co-axially rotatable with the low-speed carrier; planetary pinions journalled on the high-speed carrier and meshing with the second internal gear and the rotatable sun-gear on the low-speed carrier, said internal gears having the same pitch diameters; clutch-teeth on the low and high speed carriers; a clutch-sleeve coaxial with the carriers and provided with teeth selectively engageable with the clutch-teeth on the carriers; and means for driving a propeller-shaft from the clutch-sleeve.

8. Driving mechanism for a propeller, comprising: a driving wheel driven by an engine-shaft; an internal gear on said driving wheel; a substantially non-rotatable sun-gear; planetary pinions between and meshing with said internal gear and the non-rotating sun-gear; a low-speed carrier on which said planetary pinions are journalled and rotatable by their planetary movement; a sun-gear rotatable with the low-speed carrier; a second internal gear on the driving wheel; a high-speed carrier co-axially rotatable with the low-speed carrier; planetary pinions journalled on the high-speed carrier and meshing with the second internal gear and the rotatable sun-gear on the low-speed carrier, said internal gears having the same pitch diameter, said sun-gears having the same diameter; clutch-teeth on the low and high speed carriers; a clutch-sleeve coaxial with the carriers and provided with teeth selectively engageable with the clutch-teeth on the carriers; and means for driving a propeller-shaft from the clutch-sleeve.

9. Driving mechanism for a propeller, comprising: a driving wheel co-axial with and driven by an engine-shaft and provided with a hub; an internal gear on said driving wheel; a substantially non-rotating sun-gear co-axial with the driving wheel; a low-speed carrier co-axial with said driving wheel; planetary pinions meshing with said internal gear and the non-rotating sun-gear, journalled on and for rotating the low-speed carrier; a sun-gear attached to the low-speed carrier; a second internal gear on the driving wheel; a high-speed carrier, planetary pinions journalled on and for rotating the high-speed carrier and meshing with said second internal gear and the rotatable sun-gear; co-axial clutch-teeth on the high and low-speed carriers; a clutch-sleeve selectively and axially slidable provided with clutch-teeth for engaging the clutch-teeth on the carriers, respectively; and means for driving a propeller-shaft from the clutch-sleeve.

10. Driving mechanism for a propeller, comprising: a driving wheel co-axial with and driven by an engine-shaft and provided with a hub; an internal gear on said driving wheel; a substantially non-rotating sun-gear co-axial with the driving wheel; a low-speed carrier co-axial with said driving wheel; planetary pinions meshing with said internal gear and the non-rotating sun-gear journalled on and for rotating the low-speed carrier; a sun-gear attached to the low-speed carrier; a second internal gear on the driving wheel; a high-speed carrier, planetary pinions journalled on and for rotating the high-speed carrier and meshing with said second internal gear and the rotatable sun-gear; co-axial clutch-teeth on the high and low speed carriers; a clutch-sleeve selectively and axially slidable provided with clutch-teeth for engaging the clutch-teeth on the carriers, respectively; and means for driving a propeller-shaft from the clutch-sleeve, including a gear wheel provided with a hub on which the clutch sleeve is slidable.

11. In a two-speed transmission, a planetary gear system comprising a stationary sun gear, a driving member having geared portions, and planetary gears in mesh with said sun gear and said driving member; a carrier rotatably supporting said planetary gears; a second sun gear secured for conjoint rotation with said carrier, a second set of planetary gears in meshed engagement with said second sun gear and said driving member; a second carrier for rotatably supporting said second named planetary gears; a driven member; and means for alternately engaging each of said carriers with said driven member.

12. A two-speed transmission comprising a planetary gear system including a fixed and a movable geared member between which are disposed planetary gears; means for driving said movable member; a rotary carrier for rotatably supporting said planetary gears; a gear secured to said carrier for conjoint rotation therewith; a second set of planetary gears in meshed engagement with said carrier-attached gear and with said movable member of the planetary system; a second carrier for rotatably supporting said second named planetary gears; a driven member; and means for alternately engaging each of said carriers with said driven member.

13. A two-speed transmission for driving contra-rotating concentric shafts at reduced speed, comprising a driving shaft, a sleeve, means associated with said driving shaft for selectively producing rotation of said sleeve at predetermined speed ratios, a sun gear in engagement with said sleeve, a stationary ring gear concentrically disposed about said sun gear, planetary gears disposed between and in mesh with said ring gear and said sun gear, a planetary carrier secured to one of the driven shafts for rotatably supporting said planetary gears, a gear concentrically secured to the second contra-rotating driven shaft, a gear secured to said carrier for conjoint rotation therewith, and idler gears for reversing and transferring motion from said carrier gear to said gear on the contra-rotating driven shaft.

14. Mechanism for driving contra-rotating shafts comprising a driving member, a planetary gear train including a fixed gear and a rotary gear, said rotary gear being engaged with said driving member, planetary gears engaged with said fixed and rotary gears, a rotary carrier rotatably supporting said planetary gears, said carrier being engaged with one of the shafts to be driven, a gear concentrically disposed on said carrier for conjoint rotation therewith, a gear secured to the contra-rotating shaft and a plurality of idler gears between said carrier gear and said gear on said contra-rotating shaft whereby the shafts are driven simultaneously in opposite directions.

15. A two-speed contra-rotational transmission comprising a driving shaft, a driving member having geared portions secured to said shaft for conjoint rotation, a pair of planetary gear trains in meshed engagement with said driving member, a set of clutch teeth associated with each of said planetary gear trains, a clutch mechanism including a shiftable sleeve for alternate engagement with each set of said clutch teeth, a gear in engagement with said clutch sleeve, a stationary ring gear surrounding said gear, planetary gears between said gear and ring gear, a carrier for rotatably supporting said planetary gears, a driven shaft, said carrier being secured to said driven shaft, a gear secured to said carrier concentrically disposed relative to said driven shaft, a driven sleeve surrounding said driven shaft, a gear on said sleeve, and idler gears in meshed engagement with said second-mentioned gear on said carrier and said third-mentioned gear on said driven sleeve.

FRED J. JOHNSON.

REFERENCES CITED

The following references are of record in the file of this patent:

UNITED STATES PATENTS

| Number | Name | Date |
| --- | --- | --- |
| 1,654,432 | Rowledge | Dec. 27, 1927 |
| 2,185,545 | Egan | Jan. 2, 1940 |
| 2,233,498 | Taylor | Apr. 4, 1941 |
| 2,245,815 | Peterson | June 17, 1941 |
| 2,261,104 | Birkigt | Nov. 4, 1941 |
| 2,274,743 | Rosskopf | Mar. 3, 1942 |
| 2,285,592 | Ledwinka | June 9, 1942 |
| 2,406,460 | Guerke | Aug. 27, 1946 |
| 2,482,460 | Browne | Sept. 20, 1949 |

FOREIGN PATENTS

| Number | Country | Date |
| --- | --- | --- |
| 447,786 | Great Britain | May 26, 1936 |